United States Patent [19]
Pan

[11] Patent Number: 5,325,895
[45] Date of Patent: Jul. 5, 1994

[54] DEVICE FOR FILLING AND CLOSING PRESSURIZED-STEAM CONTAINERS

[75] Inventor: Costanzo Pan, Borgosatollo, Italy

[73] Assignee: Dierre Finanziaria, S.r.l., Brescia, Italy

[21] Appl. No.: 968,286

[22] Filed: Oct. 29, 1992

[30] Foreign Application Priority Data

Mar. 31, 1992 [IT] Italy .............................. MI92U000315
Jul. 30, 1992 [IT] Italy .............................. MI92A001867

[51] Int. Cl.$^5$ .............................................. B65B 31/00
[52] U.S. Cl. ........................................ 141/39; 141/95;
137/624.27; 251/94; 251/95
[58] Field of Search ................... 141/39, 40, 95, 37,
141/46, 51, 94, 98; 137/624.27; 251/94, 95, 96;
126/369, 369.1, 369.2; 219/243, 244, 389, 401;
261/135, DIG. 10, DIG. 65, DIG. 76

[56] References Cited

U.S. PATENT DOCUMENTS

| | | | |
|---|---|---|---|
| 634,496 | 10/1899 | Freund et al. | 251/96 |
| 5,037,066 | 8/1991 | Kerger et al. | 251/96 |

FOREIGN PATENT DOCUMENTS

1217409 4/1988 Italy .

*Primary Examiner*—Henry J. Recla
*Assistant Examiner*—Steven O. Douglas
*Attorney, Agent, or Firm*—Laff, Whitesel Conte & Saret

[57] ABSTRACT

Rotatably engaged to the filter (4, 104) of a pressurized-steam container (5, 105) is a closing member (2, 102) provided at the upper part thereof with an operating cap (6, 108). Through 180° rotations of the closing member (2, 102) the fluid communication between the container (5, 105) and the surrounding environment via a filling header (8, 109) having a supply opening (110) at the upper part thereof, is selectively opened and closed. The closing member (2, 102) is driven in rotation by means of a grip element (20, 117) that, upon command of a diaphragm (17, 113) submitted to the inner pressure of the container (105), is moved to an embedded condition in the presence of pressure in the container, thereby being inaccessible to the user.

15 Claims, 3 Drawing Sheets

DEVICE FOR FILLING AND CLOSING PRESSURIZED-STEAM CONTAINERS

BACKGROUND OF THE INVENTION

1. Field of the Invention

The present invention relates to a device for filling and closing pressurized-steam containers of the type comprising: a closing member operatively and sealingly engaged to a filler exhibited by the container: an operating cap integral with the closing member and operable in rotation so as to bring the closing member from a sealing position in which said filler is hermetically closed to the surrounding environment to a supply position in which the filler is in communication with the surrounding environment.

In more detail, the invention relates to the field of safety devices associated with fillers in steam boilers of the type used, for example, for supplying steam irons and/or washing apparatus for domestic or industrial use with water.

2. Prior Art

It is known that boilers for steam production of the above type are usually provided with a filler enabling the water required for producing steam to be introduced thereinto. A closing member is engaged by screwing to said filler. The closing member is provided with an opening cap adapted to enable the closing member to be screwed down and unscrewed manually. In addition, provision is generally also made for means adapted to eliminate or at least reduce the risk that the user may suffer from severe burns, should he/she imprudently try to remove the closing member when there is still pressurized steam in the boiler.

To this end, in the simplest construction solutions at least one vent canalization is formed in the closing member and/or the filler. Said canalization, as soon as the plug is loosened from the tightened condition, causes possible steam still present in the boiler to escape therethrough in small amounts, so that the user is visually warned about the presence of pressure in the boiler before completely removing the closing member. However, since said canalization must necessarily have a very narrow passage section, it can be easily obstructed by lime scale or other impurities, which results in its impossibility of performing the intended functions.

According to other technical solutions, the closing member is combined with a visual signaller consisting for example of a pin that, upon command of a diaphragm communicating with the inside of the boiler, protrudes from the operating cap when pressure is present in the boiler, in order to signal said pressure presence.

However, the presence of said signaller does not prevent the user from removing the closing member from the filler, due to unawareness or carelessness or perhaps because the signalling device is out of order.

There are solutions too in which a pin is provided to be associated with the boiler, which pin, in the presence of pressure, is pushed into a corresponding housing formed in the operating cap of the closing member. The engagement of the pin is said housing prevents the closing member from being removed in the presence of pressure. On the other hand, such a device has been found to be of difficult construction because it is necessary to ensure that, under tightening conditions of the closing member, said housing be perfectly aligned with the pin.

In another known construction solution the operating cap is rotatably engaged to the closing member, and can be clamped thereto by a coupling mechanism controlled by a diagram responsive to the inner boiler pressure. In greater detail, this diaphragm acts in such a manner that the operating cap rotates freely relative to the closing member in the presence of pressure in the boiler, thereby preventing the closing member from being removed therefrom. When the inner boiler pressure goes below a predetermined value, the coupling device acted upon by the diaphragm makes the operating cap integral in rotation with the closing member. Under this situation, the closing member can be removed and the boiler can be filled.

After the above description it is apparent that, irrespective of all measures adopted for safety purposes, all closing devices presently in use need the closing member to be completely removed for carrying out the boiler filling. Thus, frequent filling operations are particularly troublesome taking also into account the fact that their execution requires the aid of accessories such as funnels or the like in order to facilitate the introduction of water into the boiler.

In addition since the closing member is made as an element physically independent of the boiler, it can be easily damaged, if it is for example dropped, and maybe even inadvertently lost by the user.

It is also and above all pointed out that none of the known solutions is capable of preventing the closing member from being removed from the filler and therefore eliminating the risks of burns, should the provided safety devices be out of order.

SUMMARY OF THE INVENTION

Substantially, the main object of the present invention is to solve the problems of the known art by providing a filling and closing device that not only absolutely inhibits the opening of the container in the presence of pressure, but also enables the boiler to be filled without requiring the complete removal of the closing member as well as the aid of accessories such as funnels or the like for facilitating the introduction of water into the boiler itself.

In addition, such a device must be capable of reducing all risks of burns as much as possible in case of failure of the safety means provided for preventing the opening of the container in the presence of pressurized steam.

The foregoing and further objects that will become more apparent in the course of the present description are substantially attained by a closing device for pressurized-steam containers, further comprising: a covering envelope fastened to the container, arranged to accommodate the operating cap and the filler at least partly; a filling header exhibiting a supply opening oriented upwardly with respect to the covering envelope and communicating with a connecting portion opening to the closing member at said filler, said connecting portion being selectively connected to and hermetically separated from the filler when the closing member is in the supply position and sealing position respectively; safety means for inhibiting movement of the closing member from the sealing position to the supply position when pressure within the container exceeds a predetermined value.

BRIEF DESCRIPTION OF THE DRAWINGS

Further features and advantages will be better understood from the detailed description of some preferred embodiments of a device for filling and closing pressurized-steam containers in accordance with the present invention, given hereinafter by way of example with reference to the accompanying drawings, in which.

DESCRIPTION OF THE PREFERRED EMBODIMENTS

Figure 1:
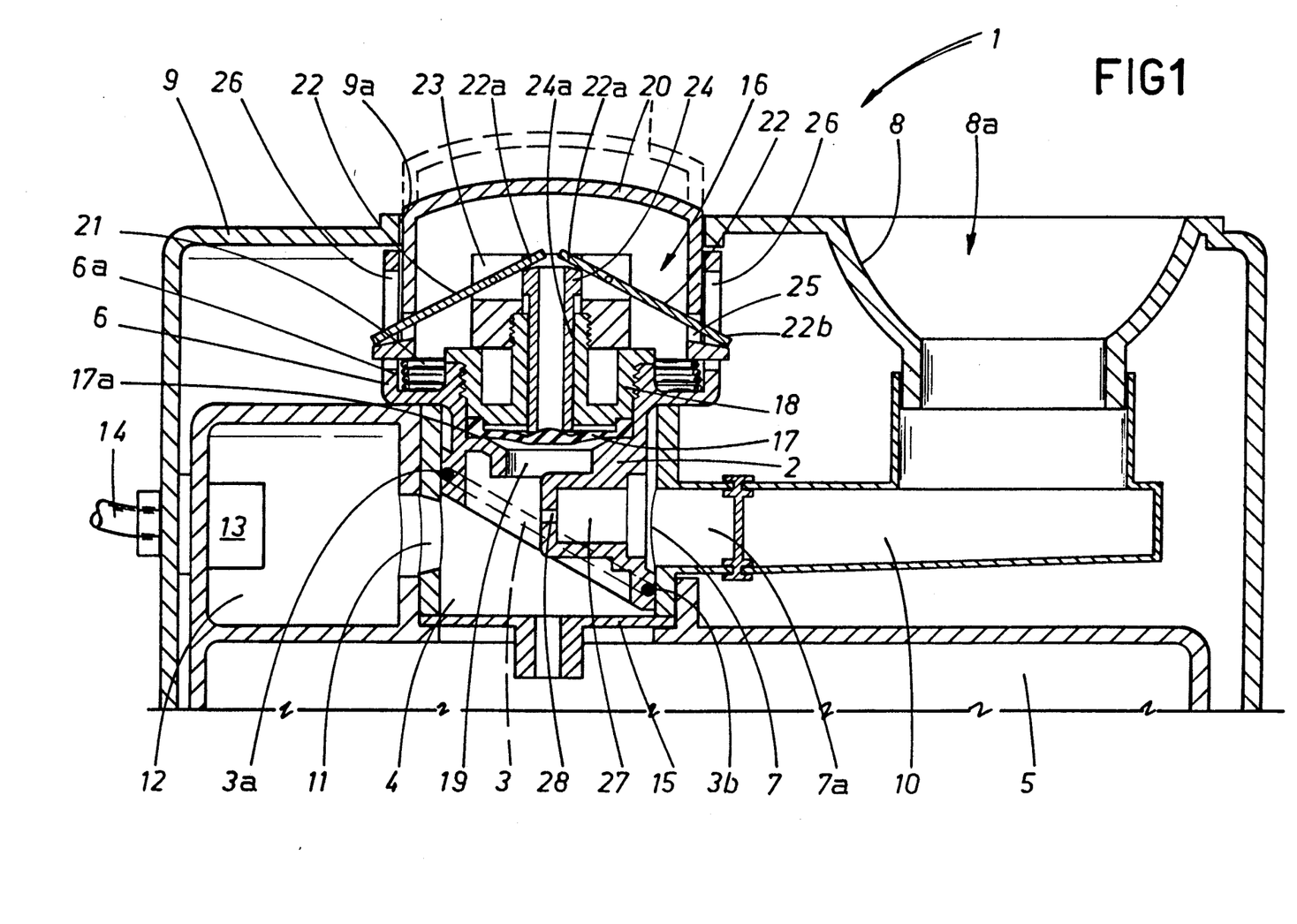
FIG. 1 is a fragmentary sectional view of one embodiment of the device of the invention, the container being closed and pressure being present inside said container.
Figure 2:
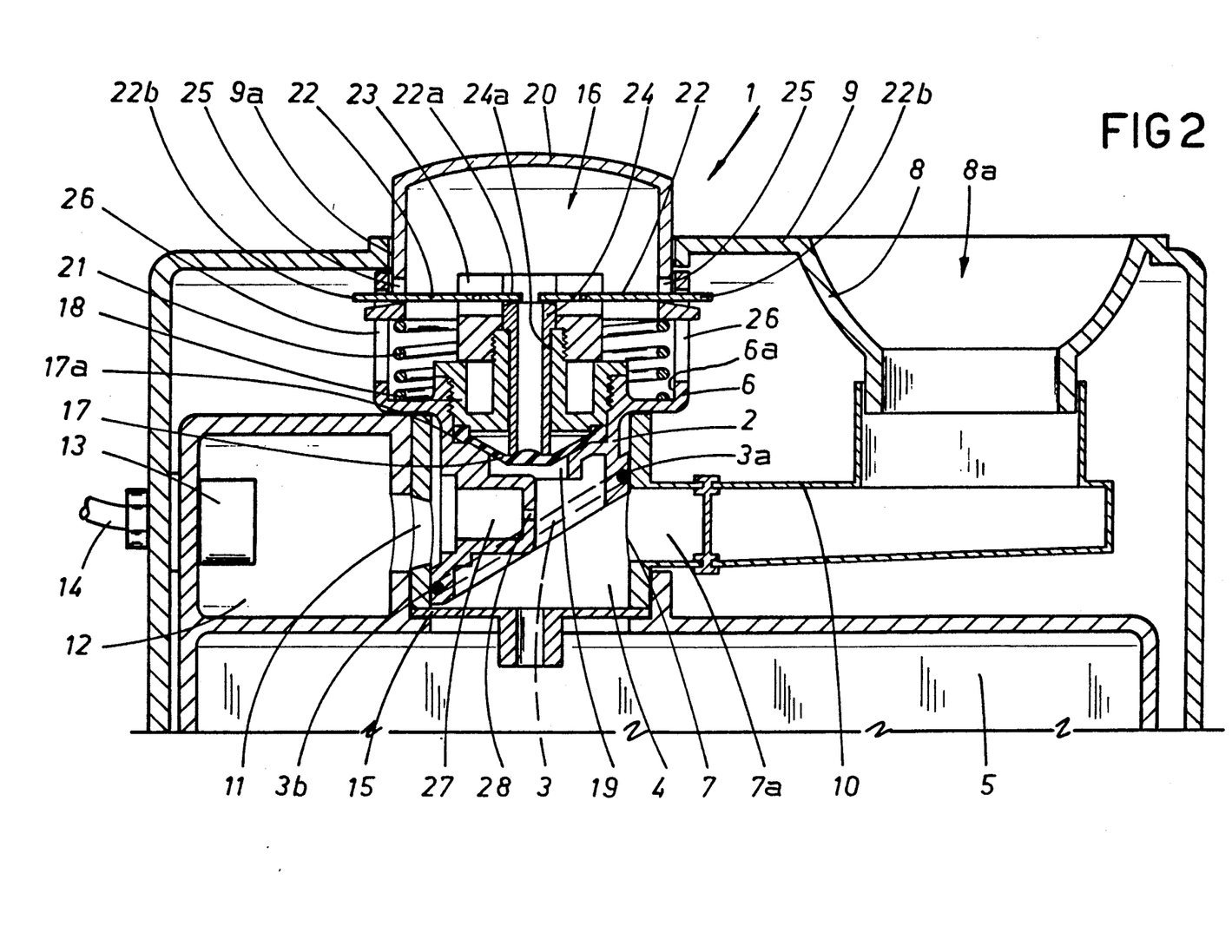
FIG. 2 shows the device of FIG. 1 when the container has been opened for filling purposes.

Referring to FIGS. 1 and 2, a device for filling and closing pressurized-steam containers according to one embodiment of the present invention has been generally identified by reference numeral 1.

The device 1 comprises a closing member 2 operatively connected, upon interposition of at least one seal 3, to a filler 4 formed on top of a pressurized-steam container 5, for example consisting of a conventional boiler used for supplying steam irons or the like with water.

Integrally associated with the closing member 2 is an operating cap 6 through which the transmission of rotational movements occurs in order to move the closing member between a sealing position (FIG. 1) in which the filler 4 is hermetically closed with respect to the environment, and a filling position (FIG. 2) in which the filler is in communication with the environment.

In greater detail, in a preferential solution the closing member 2 is originally provided to be coaxially and rotatably fitted in the filler 4, and the seal 3 is provided to be engaged about the closing member according to a substantially elliptical extension, lying in a plane disposed obliquely to the filler axis.

Advantageously the filler 4 has at least one side supply port 7 into which a connecting portion 7a communicating with the surrounding environment opens. As viewed from the figures, the seal 3 has an upper apex 3a and a lower apex 3b that are disposed over and the side supply port 7, respectively. Therefore, the supply port 7 can be selectively connected to the inside of the container 5 or hermetically separated therefrom, as a result of angular rotations through 180° to the closing member 2 in order to bring it from the sealing position to the filling and vice-versa, as better clarified in the following.

Still in accordance with the present invention, the supply port 7 is connected to a filling header 8 exhibiting a filling opening 8a facing upwardly with respect to a covering envelope 9 fastened to the container 5. In greater detail, the filling header 8, located at a laterally offset position relative to the closing member 2, is substantially funnel-shaped and communicates with the connecting portion 7a via a tubular connecting element 10 extending between the container 5 and the covering envelope 9.

According to a preferential feature of the invention, the filler 4 also has at least one side steam outflow port 11, opening into an auxiliary chamber 12 formed at the upper part of the container 5 to which a steam dispensing means is connected which is designed to dispense steam to the outside of the container. This means consists for example of a solenoid valve 13 provided with a respective pipe 14 terminating at an iron or other apparatus.

The outflow side port 11 is located at a diametrically opposite position to the supply port 7. In this way, the supply and outflow ports, 7 and 11, can be individually and selectively connected to the inside of the container 5 as a result of angular rotations through 180° carried out by the closing member 2. In other words, the outflow port 11 will communicate with the container 5 when the supply port 7 is hermetically separated from said container and vice-versa.

At least one restricting diaphragm 15 located operatively in the filler 4 suitably restricts the steam passage to the outflow port 11 in order to avoid water being transferred to the auxiliary chamber 12 by the steam flow passing from the container 5 to the auxiliary chamber.

Still in accordance with the present invention, the operating cap 6 of the closing member 2 is at least partly housed within the cover envelope 9. In other words, the operating cap 6 is such embedded in the covering envelope 9 that it does not offer any grip portion to the user for the purpose of driving the closing member 2 in rotation.

The operating cap 6 also has an inner cavity 6a in which a safety means 16 is housed which is arranged to inhibit the displacement of the closing member 2 from the closing position to the supply position when pressure within the container 5 is higher than a predetermined value. This safety means 16 is comprised of a disc-shaped diaphragm 17 sealingly connected along its circumference to an annular engagement seat 17a formed between the closing member 2 and a locking element 18 fastened to the closing member by screwing, for example. The diaphragm 17 communicates with the inside of the container 5 via an intercommunication passageway 19 defined in the closing member 2. In this way, the diaphragm 17 is subjected to deformation simultaneously with pressure variations within the container 5.

Operatively connected to the diaphragm 17 is at least one grip element 20 coaxially and slidably fitted on the operating cap 6 and movable, by effect of deformations undergone by the diaphragm itself, in a top opening 9a afforded by the covering envelope 9. In more detail, the grip element 20 is movable, against the action of a counterspring 21 acting between the operating cap 6 and the grip element, between a first position corresponding to a low pressure condition within the container 5, in which it protrudes upwardly with respect to the covering envelope 9 so that it is accessible to the user, and a second position corresponding to a high pressure condition in the container 5, in which it is retracted inside the top opening 9a and is not accessible to the user.

To this end the grip element 20 is interconnected with the diaphragm 17 by at least two idler arms 22 extending radially in symmetrically opposite directions with respect to the closing member axis. Each of the idler arms 22 is pivotally nounted on a support element 23 fastened to the inner part of the operating cap 6 and has first and second ends 22a, 22b engaged to the diaphragm 17 and grip element 20, respectively. In greater detail, the first end of each arm 22 is interconnected with the diaphragm through a transducer pin 24 guided axially in a through hole 24a formed coaxially in the locking element 18. The second end 22b is in turn slidably engaged in a through seat 25 formed in the grip element 20 and a guide groove 26 exhibited by the operating cap 6. Under this situation, the idler arms 22 are advantageously capable of transmitting to the closing member 2 rotations manually imparted to the grip element 20.

In addition, at least one safety valve 27 can also be provided which is associated with the closing member 2 and arranged to open a fluid communication 28 between the container 5 and the surrounding environment so as to enable a controlled steam venting through the supply port 7, tubular connecting element 10 and filling header 8, if, being the closing member 2 in the sealing position, the steam pressure within the container 5 exceeds a predetermined critical value.

Operation of the device according to the invention described above mainly as regards structure and as shown in FIGS. 1 and 2, is as follows.

Referring to FIG. 1, when the closing member 2 is in a sealed position and steam is created within the container 5, the consequent raising of pressure deforms the diaphragm 17 upwardly thereby causing the lifting of the transducer pin 24 and, as a result, of the first ends 22a of the idler arms 22. The second ends 22b of arms 22 are consequently lowered and they run in grooves 26, against the action of the counterspring 21 in order to lower the grip element 20 from the first to the second work position, making it inaccessible to the user. Under this situation, the user is surely unable to accidentaly open the container 2.

Steam formed in the container 5 passes through the restricting diaphragm 15, reaches the auxiliary chamber 12 through the outflow port 11 and can therefore be ejected through the solenoid valve 13 and corresponding pipe 14.

Should the inner pressure of container 5 grow beyond a predetermined limit, due to a failure, the intervention of the safety valve 27 causes the excess steam to escape through the supply port 7 and properly expand in the connecting element 10 and the filling header 8 so as to advantageously reduce its own temperature before reaching the surrounding atmosphere.

When steam production in the container 5 stops and the inner pressure of the container goes below a predetermined threshold, the diaphragm 17, possibly with the aid of the counterspring 21, comes back to the starting condition causing the transducer pin 24 to lower. Under this situation, the counterspring 21 produces the raising of the grip element 20 to the first work position, so that said element projects from the covering envelope 9 and can therefore be grasped by the user.

The user is therefore able to rotate the closing member 2 through 180°, thereby opening the fluid communication between the inside of the container 5 and the supply port 7, as shown in FIG. 2. The container 5 can be therefore supplied with water for producing new steam, said water being poured in the filling header 8 and entering the container through the tubular connecting element 10 and the supply port 7.

When filling has been completed, the closing member is rotated through 180° again by means of the grip element 20; afterwards, being pressure restored within the container 5, the grip element will take again its retracted position inside the top opening 9a provided in the covering envelope 9.

Figures 3, 4, 5:
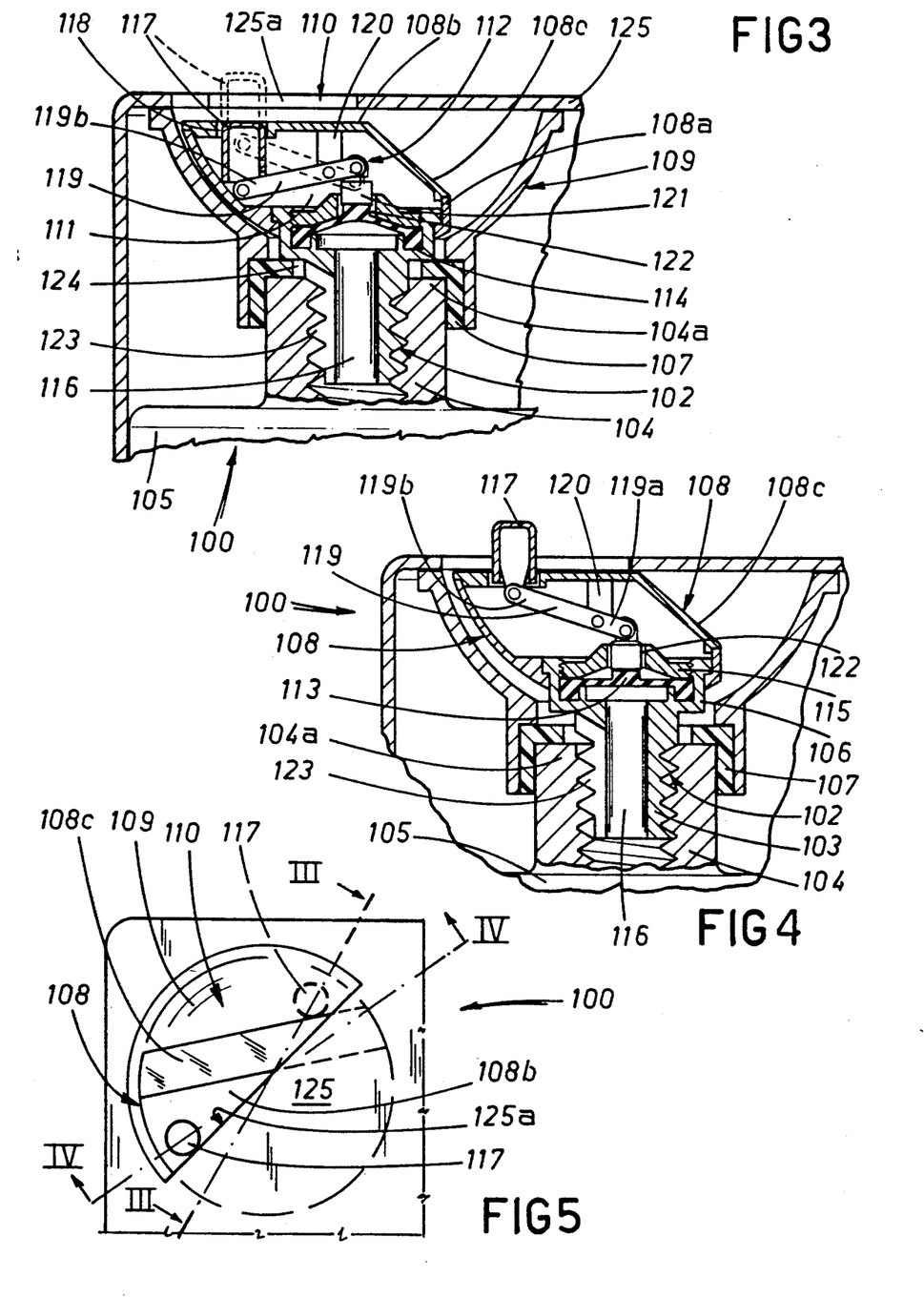
FIG. 3 is a fragmentary sectional view taken along line III—III in FIG. 5 showing a second embodiment of the device in a tightened condition.
FIG. 4 is a fragmentary sectional view taken along line IV—IV in FIG, 5 showing the device of FIG. 3 in a filling position.
FIG. 5 is a fragmentary top view of the device shown in FIGS. 3 and 4, in a filling position.

Referring now to FIGS. 3 to 5, the embodiment shown therein has been generally identified by reference numeral 100.

The device 100 essentially comprises a substantially tubular closing member 102 provided with a threaded shank 103 engaging in a cylindrical filler 104 associated with a pressurized steam container 105. The closing member 102 also exhibits a circumferential flange 106 projecting radially of the threaded shank 103 and capable of acting in abutment on a free end 104a of filler 104, upon interposition of a seal 107 applied to the filler itself.

Connected to the upper part of the closing member 102 is an operating cap 108 which, in an original manner, is at least partly housed in a filling body 109 fastened to the container 105. In greater detail, the filling body 109, which is substantially funnel-shaped, is sealingly fastened to the filler 104 around the circumference thereof and is provided at the upper part thereof with a feed opening 110 preferentially having a substantially semicircular geometric configuration.

The operating cap 108 is in turn comprised of a lower body 108a, the shape of which substantially matches that of the filling body 109 and is perimetrically integral with the circumferential flange 106 of the closing member 102 and of an upper body 108b fixedly connected to the lower body 108a and substantially extending flush with said feed opening 110.

In conclusion, the operating cap 108 is embedded in the filling body 109 so that it does not offer any grip point to the user for the purpose of unscrewing the closing member 102 from the filler 104.

As shown in FIGS. 3 and 4, the operating cap 108 is also provided with a side flaring 108c to the ends to be clarified in the following.

Defined in the operating cap 108 is an inner cavity 111 accommodating a safety means 112 arranged to inhibit unscrewing of the closing member 102 when pressure within the container 105 exceeds a predetermined value.

Said safety means 112 comprises a disc-shaped diaphragm 113 sealingly engaged between an annular engagement seat 114 formed in the upper part of the closing member 102 and a locking element 115 fastened by screwing for example to the closing member itself, in an upper part with respect to the diaphragm 113. The diaphragm 113 faces a cylindrical passageway 116 defined within the threaded shank 103 so that it gets deformed by effect of pressure present in the container 105.

Operatively connected to the diaphragm 113 is at least one grip element 117 that, by effect of deformations undergone by the diaphragm, is movable along a through aperture 118 formed in the upper body 108b of the operating cap 108.

In greater detail, the grip element 117 can be shifted between one position in which it is completely housed in the operating cap 108 and is therefore inaccessible to the user, and a second position in which said grip element 117 projects from the operating cap 108 and is accessible to the user in order to enable him/her to unscrew and screw the closing member 102.

In greater detail, the grip element 117 is connected to the diaphragm 113 by an idler arm 119 pivotally mounted at its median area to an inner projection 120 integral with the operating cap 108. The idler arm 119 has one end 119a connected to the diaphragm 113 and the second end 119b hinged to the lower part of the grip element 117.

More particularly, the first end 119a of the idler arm 119 is connected to the diaphragm 113 upon interposition of a transducer pin 121 axially sliding in a through hole 122 formed in the locking element 115 of the diaphragm itself.

An auxiliary duct 123 brings the inside of the container 105 into fluid communication with a connecting housing 124 defined by the inner perimetrical edge 107a of seal 107. In greater detail, this auxiliary duct 123 is formed along the threaded shank 103 by a longitudinal slit extending parallelly to the shank axis.

Advantageously, due to the presence of the auxiliary duct 123, operations for supplying water to the container 105 can be carried out without requiring the complete removal of the closing member 102 from filler 104. In fact, in order to make it possible to introduce water into the container 105 it is sufficient for the closing member 102 to be brought, by angular rotation of the operating cap 108 and by means of an axial stroke shorter than the threaded shank 103 length, from a locking position in which the circumferential flange 106 acts in abutment on the seal 107 as shown in FIG. 3, to a supply position in which the circumferential flange 106 is moved apart from said seal, as shown in FIG. 4.

Preferentially the axial stroke of the closing member 102 from the locking position to the supply position is restrained by stop means adapted to inhibit the complete removal of the closing member from filler 104.

In the embodiment shown, this stop means is substantially defined by an abutment portion 125 integral with the filling body 109 and extending flush with the supply opening 110. The abutment portion 125 has a terminal edge 125a acting in abutment against the grip element 117 in order to restrict the rotation of the closing member 102 to a predetermined angle, for example of about 180°.

Operation of the device according to the embodiment shown in FIGS. 3 to 5 is as follows.

Reference is made to a first operating condition in which the container 105 has steam under pressure inside it.

Under this condition the steam pressure deforms the diaphragm 113 that, with reference to the accompanying drawings, keeps the transducer pin 121 to a raised position and the first end 119a of the idler arm 119 hinged to said transducer pin.

As a result, the second end 119b of the idler arm 119 retains the grip element 117 within the inner cavity 111 formed in the operating cap 108.

Based on the foregoing, since the operating cap 108 is embedded in the filling body 109 and therefore does not offer any grip point to the user, it is impossible to act on the closing member 102 and disengage it from the locking position.

It will be also noted that, as clearly shown in FIG. 3, when the closing member 102 is in the locking position, the flaring 108c of the operating cap 108 is disposed under the abutment portion 125 of the filling body 109 and the operating cap itself by its placement to a position flush with the supply opening 110, reestablishes the continuity of the outer envelope of container 105, visually showing that the container is closed.

When pressure has gone below a given predetermined threshold, the diaphragm 113 elastically returns to a substantially non-deformed configuration; thus the transducer pin 121 moves downwardly and correspondingly the grip element 117 moves upwardly and protrudes from the operating cap 108 and the filling body 109.

For the supply operation, the user acts on the grip element 117 angularly rotating the operating cap 108 and consequently the closing member 102. As a result, the circumferential flange 106 of the closing member 102 axially moves apart from the seal 107 and through the auxiliary duct 123 connects the inside of container 105 to the atmosphere, without the closing member 102 being at any moment completely removed from the filler 104.

It is pointed out that in the supply position, as shown in FIG. 5, the flaring 108c of the operating cap 108 opens towards the supply opening 110 thereby facilitating pouring in of the supply liquid.

In particular, when supply is in progress, the liquid poured in the filling body 109 through the supply opening 110 flows into the engagement seat 114 and passes through the auxiliary duct 123, ultimately reaching the inside of container 105.

When filling has been completed, the container 105 will be closed again acting on the grip element 117, then pressure within the container will be restored, thereby causing the grip element 117 to be retracted within the inner cavity 111 of the operating cap 108.

The present invention attains the intended purposes.

In fact the device in question enables supply operations to be carried out without the separation of any component from the filler being required.

In addition, the invention surely eliminates all risks of injures to the user even if, due to an accidental malfunction of the safety means 16, 112, the container 5, 105 is opened in the presence of high pressure inside it. In this case in fact steam escaping from the filler 4, 104 through the supply port 7, 124 would be subjected to undergo an important expansion and therefore a strong cooling within the tubular connecting element 10 and/or the filling header 8, 109 before reaching the surrounding atmosphere. In addition, referring particularly to the embodiment shown in FIGS. 1 and 2, the filling header 8 could be suitably spaced apart from the grip element 20 so that steam issuing therefrom does not directly impinge on the user's hand, which on the contrary happens in known closing devices.

The invention is not considered limited to the examples chosen for purposes of illustration and includes all changes and modifications which do not constitute a departure from the true scope of this invention, as claimed in the following claims.

What is claimed is:

1. A device for filling and closing pressurized-steam containers comprising:
   a closing member (2) operatively and sealingly engaged to a filler (4) exhibited by a container (5);
   an operating cap (6) integral with the closing member (5) and rotatable so as to bring the closing member from a sealing position in which said filler (4) is hermetically closed to the environment to a supply position in which the filler (4) is in communication with the environment, said device further comprising:
   a covering envelope (9) fastened to the container (5), arranged to accommodate the operating cap (6) and the filler (4) at least partly;

a filling header (8) exhibiting a supply opening (8a) oriented upwardly with respect to the covering envelope (9) and communicating with a connecting portion (7a) opening to the closing member (5) at said filler (4), said connecting portion (7a) being selectively connected to and hermetically separated from the filler (4) when the closing member (2) is in the supply position and sealing position respectively;

safety means (16) for inhibiting movement of the closing member (2) from the sealing position to the supply position when pressure within the container (5) exceeds a predetermined value.

2. The device as claimed in claim 1, wherein said closing member (2) is coaxially and rotatably fitted in the filler (4) upon interposition of at least one seal (3) surrounding the closing member according to an elliptical extension lying in a plane disposed obliquely to the filler (4) axis, said filler exhibiting at least one side supply port (7) communicating with said connecting portion (7a) and arranged to be put into communication with the inside of the container (5) and hermetically insulated therefrom respectively, as a result of angular rotations through 180° carried out by the closing member (2) when passing between the filling and sealing positions.

3. The device as claimed in claim 2, wherein said filler (4) at a position diametrically opposed to the side supply port (7) has at least one side steam outflow port (11) opening to the inside of an auxiliary chamber (12) formed at the upper part of the container (5), the supply port (7) and outflow port (11) being individually and selectively connected to the inside of the container (5) as a result of angular rotations through 180° carried out by the closing member (2) when passing between the filling and sealing positions.

4. The device as claimed in claim 2, further comprising at least one restricting diaphragm (15) operatively disposed in the filler (4) for restricting the steam passage towards the side outflow port (11).

5. The device as claimed in claim 2, further comprising at least one safety valve (27) mounted in the cylindrical portion of the closing member (2) and arranged to bring the inner part of the container (5) into communication with the side supply port (7) when pressure in the container exceeds a predetermined safety threshold.

6. The device as claimed in claim 1, wherein said filling header (8) substantially in the form of a funnel, is integral with the covering member (9) at a laterally offset position relative to the closing member (2) and communicates with said connecting portion (7a) via a tubular connecting element (10) extending between the container (5) and said covering envelope (9).

7. The device as claimed in claim 1, wherein said safety means (16) comprises:
a diaphragm (17) sealingly connected along its circumference to an annular engagement seat (17a) formed close to the closing member (2) and oriented towards an intercommunication passageway (19) defined in the closing member and communicating with the inside of the container (5);
at least one grip element (20) operatively connected to the diaphragm (17) and movable, through a top opening (9a) afforded by said covering envelope (9), between a first position corresponding to a low pressure condition within the container (5) in which said grip element (20) protrudes upwardly with respect to the covering envelope (9), and a second position corresponding to a high pressure condition in the container (5), in which said grip element (20) is retracted inside the top opening (9a).

8. The device as claimed in claim 7, wherein said grip element (20) is coaxially and slidably fitted in the operating cap (6).

9. The device as claimed in claim 8, wherein the grip element (20) is interconnected with said diaphragm (17) by at least two idler arms (22) extending radially in symmetrically opposite directions with respect to the closing member (2) axis and each exhibiting a first and a second end (22a, 22b) engaged to the diaphragm (17) and the grip element (20) respectively, each idler arm (22) being pivotally mounted on a support element (23) fastened to the inner part of the operating cap (6).

10. The device as claimed in claim 9, wherein the second end (22b) of each idler arm (22) is slidably engaged in a through seat (25) and a guide groove (26) formed in the grip element (20) and the operating cap (6) respectively, so that said idler arms are capable of transmitting to the closing member (2) the rotations imparted to the grip element (20).

11. The device as claimed in claim 9, wherein the first end (22a) of each idler arm (22) is connected to the diaphragm (17) upon interposition of a transducer pin (24) axially guided in a through hole (24a) formed in a locking element (18) fastened to the closing member (2), on the upper part of the diaphragm itself and fixedly carrying said support element (23).

12. The device as claimed in claim 8, further comprising at least one counterspring (21) acting between the operating cap (6) and said grip element (20) so as to urge the grip element towards its first position.

13. A device for filling and closing pressurized-steam containers of the type comprising:
a closing member (102) provided with a threaded shank (103) engaged in a filler (104) exhibited by a container (105) and a circumferential flange (106) projecting radially with respect to the threaded shank (103) beyond a free end (104a) of the filler (104);
an operating cap (108) integral with the closing member (102) at the upper part thereof;
a seal (107) operatively interposed between the circumferential flange (10) and the free end (104a) of the filler (104), said device further comprising:
a filling body (109) fastened to the container (105) at the filler (104) thereof, which is arranged to receive said operating cap (106) at least partly and is provided at the upper part thereof with a supply opening (110);
at least one auxiliary duct (123) bringing the inside of the container (105) into fluid communication with a connecting portion (124) limited by the inner circumferential edge of the seal (107), so that the closing member (102), following an angular rotation involving an axial displacement lower than the length of the threaded shank (103), is movable from a looking position in which the circumferential flange (106) acts in abutment on the seal (107) and a supply position in which the circumferential flange (106) is moved apart from the seal (107) in order to open a fluid communication between the inside of the container (105) and the filling body (109);
safety means (112) for inhibiting the displacement of the closing member (102) from the locking position to the supply position when pressure within the container (105) exceeds a predetermined value.

14. The device as claimed in claim 13, wherein said safety means (112) comprises:

a sealing diaphragm (113) connected along the circumference thereof to an annular engagement seat (114) formed in the upper part of the closing member (102) and facing a cylindrical passageway (116) defined in the threaded shank (103) and communicating with the inside of the container (105);

at least one grip element (117) operatively connected to the diaphragm (113) and movable in a through aperture (118) formed in the operating cap (108), from a first position corresponding to a low pressure condition within the container (105) in which said grip element (117) protrudes from the operating cap (108), to a second position corresponding to a high pressure condition in the container (105), in which said grip element (117) is housed in an inner cavity (111) of the operating cap (108).

15. The device as claimed in claim 13, wherein said filling body (109) is substantially funnel-shaped.

* * * * *

UNITED STATES PATENT AND TRADEMARK OFFICE
CERTIFICATE OF CORRECTION

PATENT NO. :     5,325,895

DATED      :     July 5, 1994

INVENTOR(S) :    Costanzo Pan

It is certified that error appears in the above-identified patent and that said Letters Patent is hereby corrected as shown below:

On the title page, item
[73] Societa Anonima Costruzioni Techniche Sammarinesi - C.T.S.

Signed and Sealed this

Fourth Day of April, 1995

Attest:

BRUCE LEHMAN

Attesting Officer         Commissioner of Patents and Trademarks